S. A. SMITH.
PULLEY.

No. 111,582.

Patented Feb. 7, 1871.

Witnesses:

Inventor:
Scott A. Smith
by Wiedersheim & Norris
Attys.

UNITED STATES PATENT OFFICE.

SCOTT A. SMITH, OF PHILADELPHIA, PENNSYLVANIA, ASSIGNOR TO CRESSON & SMITH, OF SAME PLACE.

IMPROVEMENT IN PULLEYS.

Specification forming part of Letters Patent No. 111,582, dated February 7, 1871.

*To all whom it may concern:*

Be it known that I, SCOTT A. SMITH, of the city and county of Philadelphia, and State of Pennsylvania, have made new and useful Improvements in Pulleys; and I do hereby declare the following to be a clear and exact description of the nature thereof, sufficient to enable others skilled in the art to which my invention appertains to fully understand and use the same, reference being had to the accompanying drawings, making part of this specification, in which—

Figure 1:
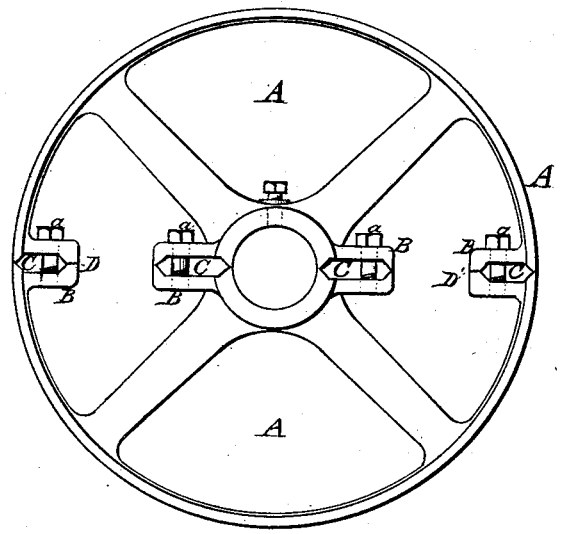
Figure 2:
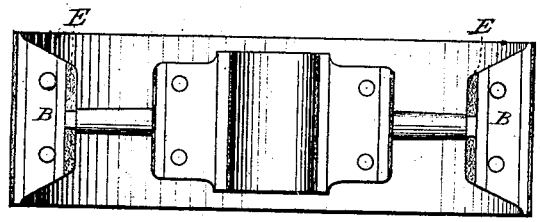

Figure 1 is a side elevation of the pulley illustrating my invention. Fig. 2 is a horizontal section in line $x\ x$, Fig. 1.

Similar letters of reference indicate corresponding parts in the two figures.

My invention relates to that class of pulleys (generally known as "half-pulleys") which are cast in one piece, and afterward wedged or broken apart, so that they may be applied to or removed from the shaft without displacing or disturbing the latter.

The object of the invention is to so construct the pulley that the two parts cannot move on each other under the strain to which it may be subjected, and also to prevent overlapping of its rim.

In the drawings, A represents a pulley, which is cast in one piece with lugs B, having cored openings C. The pulley is wedged apart or broken in any well-known manner to form sections A' A", the fractures or seams being represented at D D'. The cored openings are preferably formed with pointed ends, so as to cause the sections to break in straight lines. The fractures leave somewhat roughened surfaces E E, as best seen in Fig. 2. When the two sections are placed together on the shaft, the respective surfaces E E of each section come in contact and interlock with each other, and the bolts or screws $a$ clamp the sections firmly together. It will be seen that the sections cannot move on each other under the strain to which they may be subjected when in use. The rim of the pulley will not overlap, and consequently presents an unbroken surface.

I thus produce a sectional pulley combining firmness, reliability, and uniformity.

Having thus described my invention, what I claim as new, and desire to secure by Letters Patent, is—

In a pulley cast in one piece and afterward separated, the surfaces E E, substantially as and for the purpose described.

The above signed by me this 29th day of December, 1870.

SCOTT A. SMITH.

Witnesses:
 THOMAS H. O'BRIEN,
 E. OSCAR HAEUPTNER.